US012704751B2

(12) United States Patent
Son et al.

(10) Patent No.: US 12,704,751 B2
(45) Date of Patent: Aug. 11, 2026

(54) DISPLAY DEVICE

(71) Applicant: LG Display Co., Ltd., Seoul (KR)

(72) Inventors: Ji-Cheol Son, Gumi-si (KR); Ji-Soon Oh, Daegu (KR); Yeoun-Jei Jung, Daegu (KR); Sung-Sik Son, Gumi-si (KR); Chan-Hyeok Park, Gumi-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/610,603

(22) Filed: Mar. 20, 2024

(65) Prior Publication Data

US 2024/0255794 A1 Aug. 1, 2024

Related U.S. Application Data

(62) Division of application No. 17/980,465, filed on Nov. 3, 2022, now Pat. No. 11,966,114, which is a division (Continued)

(30) Foreign Application Priority Data

Aug. 27, 2018 (KR) ........................ 10-2018-0100128

(51) Int. Cl.
*G02F 1/1335* (2006.01)
*G02F 1/133* (2006.01)
(Continued)

(52) U.S. Cl.
CPC .... *G02F 1/133512* (2013.01); *H04M 1/0264* (2013.01); *H04N 23/57* (2023.01);
(Continued)

(58) Field of Classification Search
CPC ..... G06F 1/1686; H04M 1/03; H04M 1/0264; H04N 5/2257; G02F 1/133512;
(Continued)

(56) References Cited

U.S. PATENT DOCUMENTS 9,778,411 B2 10/2017 Yuki et al.
9,933,563 B2 4/2018 Yuki et al.
(Continued)

FOREIGN PATENT DOCUMENTS

CN 1924664 A 3/2007
CN 101097340 A 1/2008
(Continued)

OTHER PUBLICATIONS

Chinese Office Action dated Dec. 16, 2021, issued in corresponding Chinese Patent Application No. 201910795423.X.
(Continued)

*Primary Examiner* — Jessica M Merlin
(74) *Attorney, Agent, or Firm* — Morgan, Lewis & Bockius LLP

(57) ABSTRACT

A display device includes: a backlight unit, a camera hole penetrating the backlight unit, a camera in the camera hole, a liquid crystal panel on the backlight unit, the liquid crystal panel including a transparent portion on the camera hole, and at least one light-blocking member in the camera hole, the at least one light-blocking member being configured to reduce one or more of: light leakage from the camera hole and introduction of impurities into the camera hole.

4 Claims, 15 Drawing Sheets

Related U.S. Application Data of application No. 17/133,733, filed on Dec. 24, 2020, now Pat. No. 11,526,047, which is a division of application No. 16/511,509, filed on Jul. 15, 2019, now Pat. No. 10,908,450.

(51) Int. Cl.

| | |
|---|---|
| ***G02F 1/1333*** | (2006.01) |
| ***G02F 1/13357*** | (2006.01) |
| ***H04M 1/02*** | (2006.01) |
| ***H04N 23/57*** | (2023.01) |

(52) U.S. Cl.

CPC .... *G02F 1/13312* (2021.01); *G02F 1/133311* (2021.01); *G02F 1/133541* (2021.01); *G02F 1/133602* (2013.01)

(58) Field of Classification Search

CPC ......... G02F 1/133311; G02F 2201/501; G02F 1/133308

See application file for complete search history.

(56) References Cited

U.S. PATENT DOCUMENTS

| | | | | |
|---|---|---|---|---|
| 10,267,976 | B1 | 4/2019 | Zheng et al. | |
| 10,334,148 | B2 | 6/2019 | Kwak et al. | |
| 10,338,644 | B2 | 7/2019 | Jung et al. | |
| 10,473,844 | B2 | 11/2019 | Han et al. | |
| 10,712,609 | B1 | 7/2020 | Yen et al. | |
| 2007/0052880 | A1 | 3/2007 | Lv et al. | |
| 2007/0182903 | A1 | 8/2007 | Ochiai et al. | |
| 2008/0002099 | A1 | 1/2008 | Oh | |
| 2009/0121226 | A1 | 5/2009 | Isamu et al. | |
| 2009/0322989 | A1 | 12/2009 | Kim et al. | |
| 2012/0105400 | A1 | 5/2012 | Mathew et al. | |
| 2014/0063406 | A1 | 3/2014 | Park et al. | |
| 2016/0011633 | A1 | 1/2016 | Watanabe et al. | |
| 2016/0161664 | A1 | 6/2016 | Ishida et al. | |
| 2016/0202515 | A1 | 7/2016 | Watanabe et al. | |
| 2017/0012086 | A1 | 1/2017 | Kim et al. | |
| 2017/0059771 | A1 | 3/2017 | Yuki et al. | |
| 2017/0068287 | A1 | 3/2017 | Jung et al. | |
| 2017/0075174 | A1 | 3/2017 | Lee et al. | |
| 2017/0090113 | A1* | 3/2017 | Yuki | G02B 6/0088 |
| 2017/0123140 | A1 | 5/2017 | Han et al. | |
| 2018/0124898 | A1 | 5/2018 | Kwon et al. | |
| 2018/0157362 | A1 | 6/2018 | Kim et al. | |
| 2019/0146146 | A1* | 5/2019 | Nakajima | G02F 1/133528 362/611 |
| 2019/0302527 | A1 | 10/2019 | Cheng | |
| 2020/0064681 | A1 | 2/2020 | Son et al. | |
| 2021/0072588 | A1* | 3/2021 | Tang | G02F 1/133608 |
| 2021/0088830 | A1 | 3/2021 | Tang et al. | |

FOREIGN PATENT DOCUMENTS

| | | | |
|---|---|---|---|
| CN | 101430469 | A | 5/2009 |
| CN | 202394156 | U | 8/2012 |
| CN | 103676371 | A | 3/2014 |
| CN | 105431753 | A | 3/2016 |
| CN | 106461172 | A | 2/2017 |
| CN | 106461173 | A | 2/2017 |
| CN | 106530965 | A | 3/2017 |
| CN | 106814503 | A | 6/2017 |
| CN | 106873214 | A | 6/2017 |
| CN | 106918964 | A | 7/2017 |
| CN | 106970440 | A | 7/2017 |
| CN | 106990578 | A | 7/2017 |
| CN | 107229148 | A | 10/2017 |
| CN | 107241466 | A | 10/2017 |
| CN | 108427228 | A | 8/2018 |
| EP | 3 779 938 | A1 | 2/2021 |
| JP | 2003-167241 | A | 6/2003 |
| JP | 2014103458 | A | 6/2014 |
| KR | 20100002816 | A | 1/2010 |
| KR | 10-2010-0038921 | A | 4/2010 |
| KR | 10-2018-0046960 | A | 5/2018 |
| KR | 10-2018-0063633 | A | 6/2018 |
| KR | 10-2020-0023763 | A | 3/2020 |

OTHER PUBLICATIONS

Office Action dated Mar. 25, 2021, issued in corresponding German Patent Application No. 10 2019 119 773.2.

Office Action dated Aug. 4, 2022, with Search Report dated Jul. 8, 2022, issued in corresponding Chinese Patent Application No. 201910795423.X.

Office Action issued on Nov. 28, 2025 in Chinese Patent Application No. 202211272190.3 with English translation (Note: CN105431753A and CN106970440A cited therein are already of record. ).

Office Action issued on Dec. 18, 2025 in Korean Patent Application No. 10-2025-0066828 (Note: US2016/0161664A1 cited therein is already of record.).

Notice of Allowance issued on Jul. 1, 2026 in Korean Patent Application No. 10-2025-0066828 (Note: KR1020180046960A and US20160161664A1 cited therein are alreay of record.).

* cited by examiner (a)

| 0° | 20° | 30° | 40° |
|---|---|---|---|
| | | | |
| 45° | 50° | 60° | 70° |
| | | | |

DISPLAY DEVICE

CROSS-REFERENCE TO RELATED APPLICATION(S)

This application is a divisional of U.S. patent application Ser. No. 17/980,465, filed on Nov. 3, 2022, which is a divisional of U.S. patent application Ser. No. 17/133,733, filed on Dec. 24, 2020, now U.S. Pat. No. 11,526,047, which is a divisional of U.S. patent application Ser. No. 16/511,509, filed on Jul. 15, 2019, now U.S. Pat. No. 10,908,450, which claims the benefit of and priority to Korean Patent Application No. 10-2018-0100128, filed on Aug. 27, 2018, the entirety of each of which is hereby incorporated by reference.

BACKGROUND

1. Technical Field

The present disclosure relates to a display device, and more particularly, to a display device including a camera.

2. Discussion of the Related Art

Recently, in the information society, there has been an increasing emphasis on the importance of display devices and displays as visual information delivery media. Thus, display devices and displays need to satisfy requirements, such as low power consumption, small thickness, and high image quality to occupy an important position in the future.

A display may be classified into an emissive type display that is capable of autonomously emitting light, e.g., a cathode ray tube (CRT), an electroluminescent (EL) display, a light-emitting diode (LED), a vacuum fluorescent display (VFD), a field emission display (FED), or a plasma display panel (PDP); and a non-emissive type display that is not capable of autonomously emitting light, e.g., a liquid crystal display (LCD). Among such various displays, the LCD is a device that displays an image using the optically anisotropic quality of liquid crystals, and has drawn attention due to the small amount of radiation emitted therefrom, as well as excellent visibility compared with an existing CRT and average (e.g., reduced) power consumption compared with a CRT with the same screen size.

Such an LCD may realize an image by adjusting the transmittance of light generated by a light source by disposing the light source below liquid crystals and applying an electric field to the liquid crystals to control the arrangement of the liquid crystals. The LCD is applicable to various electronic devices, such as a smart phone or a tablet personal computer (PC). In particular, the LCD is configured in such a way that a liquid crystal panel is disposed below a cover glass, and a backlight unit is disposed below the liquid crystal panel, and includes a cover bottom for accommodating or supporting the liquid crystal or the backlight unit. As a recent display has aimed for a slim bezel with a small thickness and an ultra-thin display, there has been increasing demand for a thin and light display device.

Recently, a display device of a mobile device or the like has achieved a narrow bezel, which is formed by minimizing the width of the bezel to widen a viewing region of a liquid panel in the device as well as a slim bezel. However, when a liquid crystal panel is extended to a front surface of a device to realize a narrow bezel in a display including a camera, the liquid crystal panel may extend to a region in which the camera is installed. For example, a through-hole needs to be formed to penetrate a liquid crystal panel, a polarizing plate, and a backlight unit of a camera hole region in which the camera is installed, or the corresponding portion needs to be transparent.

SUMMARY

Accordingly, the present disclosure is directed to a display device that substantially obviates one or more of the issues due to limitations and disadvantages of the related art.

An aspect of the present disclosure is to provide a display device for reducing or preventing light leakage and the introduction of impurities into a camera hole in a narrow bezel display including a camera. As such, a display device according an embodiment may include at least one light-blocking member. The term "light-blocking member" may generally refer to an element that is adapted to reduce light leakage from the camera hole and/or introduction of impurities into the camera hole.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display device, including: a backlight unit, a camera hole penetrating the backlight unit, a camera in the camera hole, a liquid crystal panel on the backlight unit, the liquid crystal panel including a transparent portion on the camera hole, and at least one light-blocking member in the camera hole, the at least one light-blocking member being configured to reduce one or more of: light leakage from the camera hole and introduction of impurities into the camera hole.

In another aspect, there is provided a display device, including: a backlight unit, a liquid crystal panel on the backlight unit, a camera hole penetrating the backlight unit and the liquid crystal panel, a camera in the camera hole, and a light-blocking tape covering a portion of the camera hole located between the camera and the liquid crystal panel, the light-blocking tape being configured to reduce one or more of: light leakage from the camera hole and introduction of impurities into the camera hole.

In another aspect, there is provided a display device, including: a backlight unit including a light guide plate, a camera hole penetrating the backlight unit, a camera in the camera hole, a liquid crystal panel on the backlight unit, the liquid crystal panel including a transparent portion on the camera hole, wherein a side surface of the light guide plate adjacent to the camera hole is inclined by a predetermined angle with respect to a line extending vertically from the light guide plate to the liquid crystal panel, the side surface of the light guide plate being configured to reduce light leakage from the camera hole.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

FIG. 14 is a diagram showing a simulation result of bright line distribution of light depending on an inclination angle of a light guide plate of FIG. 13.

Figure 1A:
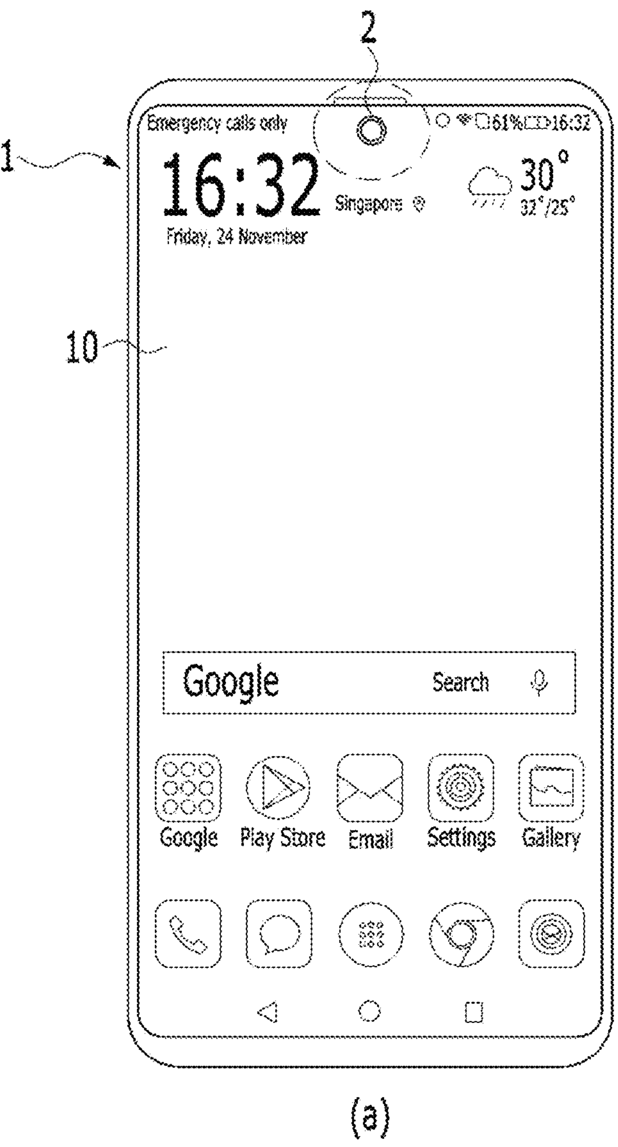
FIG. 1A is a front view of a display device including a camera according to an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a display device according to an embodiment of the present disclosure will be described in detail with reference to the accompanying drawings.

Figure 1B:
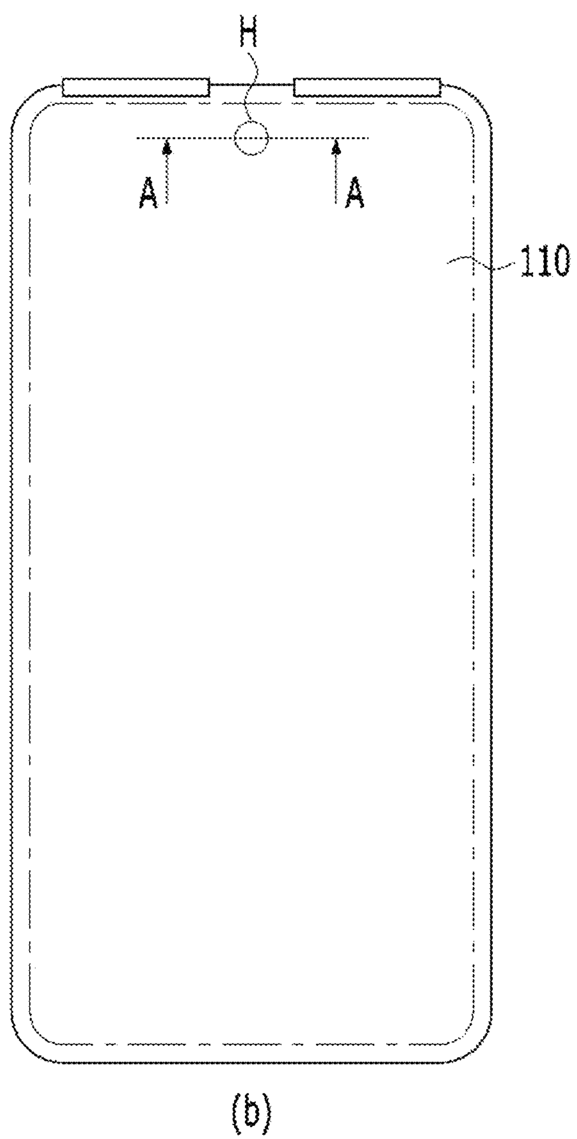
FIG. 1B is a front view illustrating an embodiment in a state in which a cover glass and an upper cover are removed.
Figure 2:
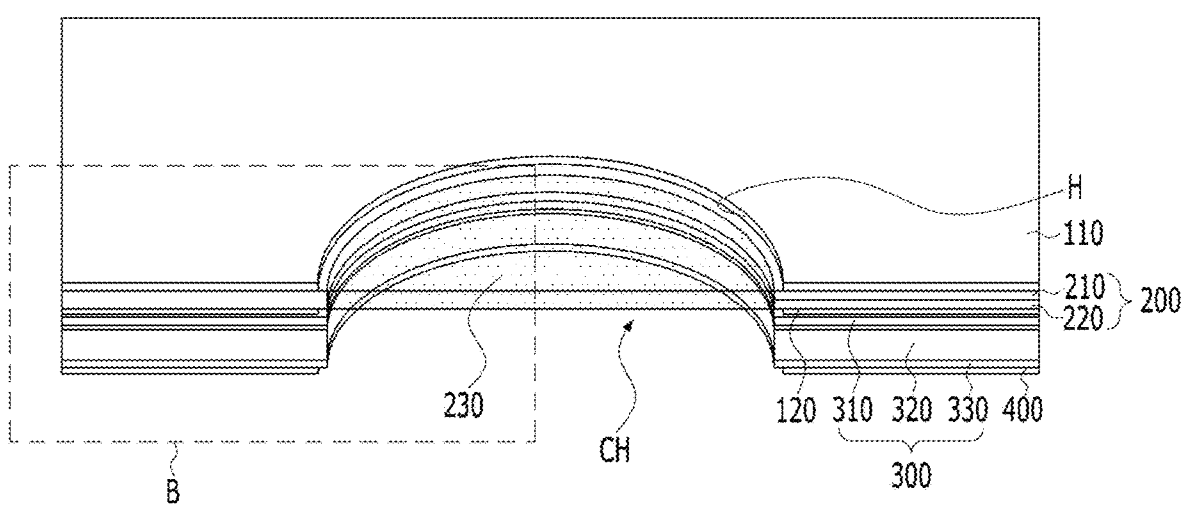
FIG. 2 is a perspective view taken along line A-A of FIG. 1, part (b).

FIG. 1A is a front view of a display device including a camera according to an embodiment. FIG. 1B is a front view illustrating an embodiment in a state in which a cover glass and an upper cover are removed. FIG. 2 is a perspective view taken along line A-A of FIG. 1B.

With reference to FIG. 1A, a display device 1 according to an embodiment may include a camera 2 installed at a front surface of the display device 1, and may be achieved with a narrow bezel by reducing or minimizing the thickness of a bezel to increase or maximize the width of a viewing region of a liquid crystal panel 200 (see FIG. 2) covered by a cover glass 10. The cover glass 10 may include a protective film (not shown) disposed at the upper surface of the cover glass 10. The cover glass 10 may include a touch panel (not shown). The touch panel may be a resistive-type touch panel for recognizing the coordinates of the position at which pressure is applied by densely installing sensor lines that respond to pressure applied to a surface, or may be a capacitive-type touch panel for recognizing a position corresponding to a touch by charging a surface of the cover glass 10 with an electric charge, installing sensors around the surface, and then detecting the degree to which the electric charge drops in the event of a touch.

As shown in FIG. 1B, an upper polarizing plate 110 may be below the cover glass 10, and a through-hole H may penetrate the upper polarizing plate 110 to operate the camera 2. As shown in FIG. 2, the through-hole H in the upper polarizing plate 110 may have a position and size corresponding to a camera hole CH in which the camera 2 may be installed.

The liquid crystal panel 200 may be between the through-hole H and the camera hole CH. The liquid crystal panel 200 may include a transparent portion 230 between the through-hole H and the camera hole CH.

The liquid crystal panel 200 may include pixels arranged in a matrix form to output an image, and may include a color filter substrate 210 and an array substrate 220 that may face each other and may be closely adhered to each other to maintain a uniform cell gap, and a liquid crystal layer (not shown) on which the cell gap between the color filter substrate 210 and the array substrate 220 may be formed. The color filter substrate 210 may include a color filter including a plurality of sub-color filters for realizing red, green, and blue (RGB) colors, a black matrix that may separate the sub-color filters and block light transmitted through the liquid crystal layer, and an overcoat layer on the color filter and the black matrix.

A gate line and a data line, which may be perpendicularly and horizontally arranged to define a pixel region may be on the array substrate 220. A thin-film transistor (TFT), as a switching device may be at an intersection region between the gate line and the data line. The TFT may include a gate electrode connected to the gate line, a source electrode connected to the data line, and a drain electrode connected to a pixel electrode.

A common electrode and a pixel electrode may be on the liquid crystal panel 200, with the color filter substrate 210 and the array substrate 220 being adhered to each other, to apply an electric field to the liquid crystal layer. A voltage of a data signal applied to the pixel electrode may be controlled in the state in which a voltage is applied to the common electrode. Then, liquid crystals of the liquid crystal layer may be rotated due to dielectric anisotropy according to an electric field between the common electrode and the pixel electrode, and may thus transmit or block light for each pixel to display text or images. For example, to control the voltage of the data signal applied to the pixel electrode for each pixel, a switching device such as a TFT may be separately included in pixels.

The transparent portion 230 may have a shape and size corresponding to the camera hole CH and the through-hole H, and may be maintained in a transparent state to allow the camera 2 to perform photography. For example, the transparent portion 230 may be controlled to make a portion of the liquid crystal panel 200 transparent using a method of adjusting a sub-filter of a layer of the color filter substrate 210.

Polarizing plates 110 and 120 may be attached above and below an external side of the color filter substrate 210 and the array substrate 220, respectively. For example, the lower polarizing plate 120 may polarize light transmitted through a backlight unit 300 in a direction toward the array substrate 220, and the upper polarizing plate 110 may polarize light transmitted through the liquid crystal panel 200. The backlight unit 300 may include a light guide plate 320 below the liquid crystal panel 200, a plurality of optical sheets 310 for enhancing the efficiency of light emitted from the light guide plate 320 and emitting light to the liquid crystal panel 200, and a reflector plate 330.

The light guide plate 320 may receive light from a light source (not shown), and may guide the light in a direction toward the liquid crystal panel 200. The light guide plate 320 may include a plastic material, such as polymethylmethacrylate (PMMA) or polycarbonate (PC).

The optical sheet 310 may include a diffusion sheet and a prism sheet, and may additionally include a brightness enhancement film, such as DBEF (dual brightness enhancement film) and a protective sheet. The optical sheet 310 may be between an upper surface of the light guide plate 320 and a rear surface of the liquid crystal panel 200.

The reflector plate 330 may be between a cover bottom 400 and a bottom surface of the light guide plate 320. The reflector plate 330 may reflect light emitted from a light source and light reflected from the light guide plate 320 in a direction toward the liquid crystal panel 200. The light emitted from the light source may be incident on a side surface of the light guide plate 320 including a transparent material, and the reflector plate 330 on the bottom surface of the light guide plate 320 may reflect the light transmitted through the bottom surface of the light guide plate 320 in a direction toward the optical sheet 310 of the upper surface of the light guide plate 320 to reduce the loss of light and to enhance uniformity of brightness.

The backlight unit 300 including the aforementioned configuration may be accommodated in the cover bottom 400. The backlight unit 300 is not limited to the aforementioned structure, and a backlight unit 300 having any structure may also be applied to the display device 1 according to the present disclosure.

The cover bottom 400 may accommodate the backlight unit 300 and a guide panel therein, and may support the aforementioned liquid crystal panel 200. For example, the cover bottom 400 may be configured with only a bottom portion and a side surface portion for a minimized and/or slimmed bezel region. For example, the cover bottom 400 may include a bottom portion having a rectangular plate shape and a side surface portion that protrudes upwards from one side of the bottom portion by a predetermined length. The aforementioned cover bottom 400 is merely an example, and may be applied to the display device 1 according to the present disclosure in any of various shapes.

The display device 1 according to an embodiment may be configured in such a way that the through-hole H may be in the upper polarizing plate 110, and the camera hole CH for installing the camera 2 therein may be in (e.g., defined in) the backlight unit 300 and the cover bottom 400. The transparent portion 230 of the liquid crystal panel 200 may be between the through-hole H and the camera hole CH.

Figure 3:
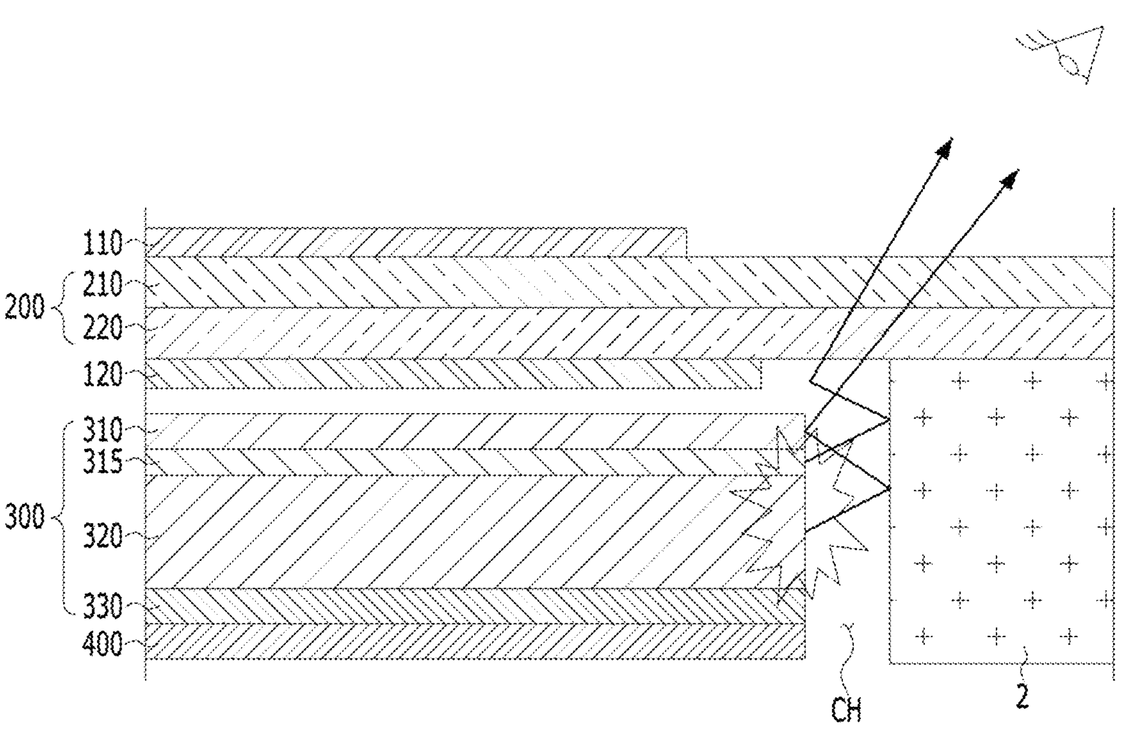
FIG. 3 is a cross-sectional view of region 'B' of FIG. 2, and illustrates a case in which light leakage from a camera hole region occurs.

FIG. 3 is a cross-sectional view of region 'B' of FIG. 2, and illustrates a case in which light leakage from a camera hole region occurs.

As shown in FIG. 3, the camera hole CH may penetrate the aforementioned backlight unit 300 and the cover bottom 400. For example, the camera hole CH may penetrate the lower polarizing plate 120, the optical sheet 310, the light guide plate 320, the reflector plate 330, and the cover bottom 400, and may be below the transparent portion 230 of the liquid crystal panel 200. A diffuser 315 may be in the backlight unit 300. The camera hole CH may penetrate the diffuser 315, as well.

The camera 2 may be installed in the aforementioned camera hole CH, and may be operated to capture an image or a video image below the transparent portion 230 of the liquid crystal panel 200. However, a gap may be present between the camera 2 and the camera hole CH. For example, as indicated by the arrows shown in FIG. 3, light transmitted through the light guide plate 320 from the light source of the backlight unit 300 may leak to above the transparent portion 230 of the liquid crystal panel 200 through the gap; for example, light leakage may occur. Such light leakage may be perceptible at a particular viewing angle through the camera 2, thus causing a problem of degradation of the photographic quality of the camera 2 and reduction in display performance.

As impurities, such as dust may be introduced through the camera hole CH, display quality may be degraded, e.g., spreading or blurriness may occur. As such, embodiments of the present disclosure may reduce or prevent light leakage around the camera hole CH and the introduction of impurities, which degrade display performance.

Figure 4:
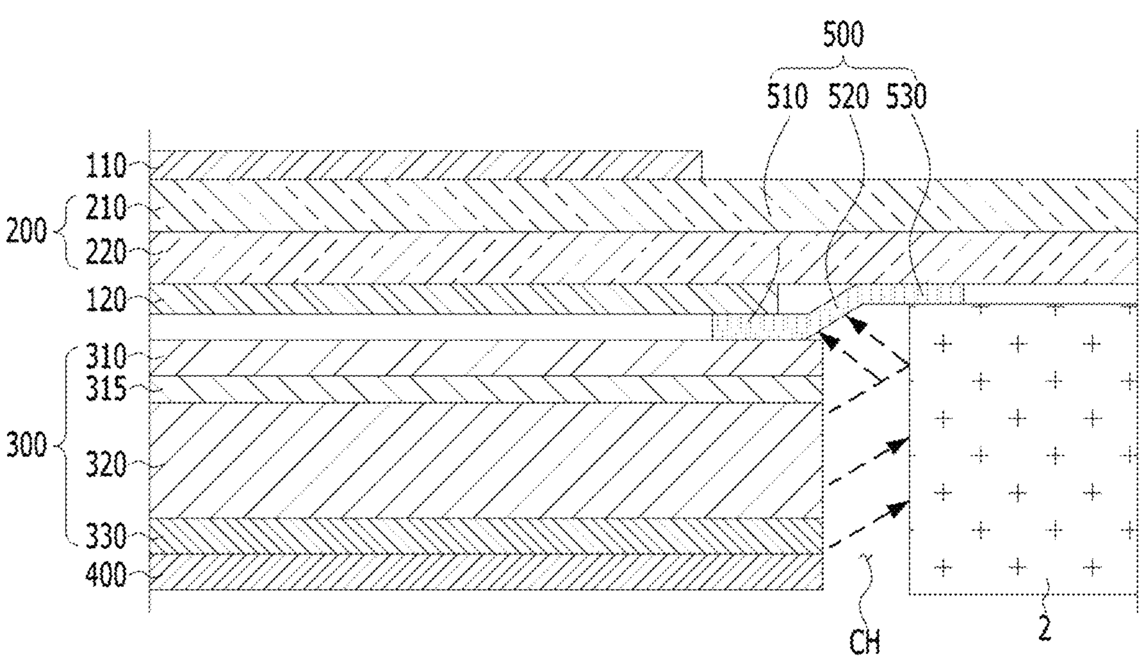
FIG. 4 is a cross-sectional view of a cameral hole region in a display device according to a first embodiment.

FIG. 4 is a cross-sectional view of a camera hole region in a display device according to a first embodiment.

With reference to FIG. 4, the display device 1 according to the first embodiment may include, as a light-blocking member, a light-blocking tape 500 installed in the aforementioned camera hole CH. The light-blocking tape 500 may be attached to the lower polarizing plate 120 and the liquid crystal panel 200, which may be at an upper region of a side surface of the camera hole CH to reduce or prevent light leakage and the introduction of impurities.

For example, when the camera hole CH has a circular cross-section, the light-blocking tape 500 may be shaped as a ring that is a circle concentric with the circumferential surface of the camera hole CH. The light-blocking tape 500 may be divided into a lower adhesive portion 510, an upper adhesive portion 530, and a shielding portion 520 according to the position thereof. The light-blocking tape 500 may have a color (e.g., black) that is capable of blocking light. An adhesive may be coated on opposite surfaces of the light-blocking tape 500.

The lower adhesive portion 510 may be adhered and fixed to the lower polarizing plate 120 and the optical sheet 310, and may be between the lower polarizing plate 120 and the optical sheet 310. For example, the lower adhesive portion 510 may be the outermost circumferential region of the light-blocking tape 500.

The upper adhesive portion 530 may be adhered and fixed to the liquid crystal panel 200 and the camera 2, and may be between the liquid crystal panel 200 and the camera 2. For example, the upper adhesive portion 530 may be the innermost circumferential region of the light-blocking tape 500.

The shielding portion 520 may connect the lower adhesive portion 510 and the upper adhesive portion 530, and may cover the upper region of the side surface of the camera hole CH in which the camera 2 may be installed. For example, the shielding portion 520 may function as a shielding film for reducing or preventing light from externally leaking from the upper region of the side surface of the camera hole CH, and for reducing or preventing impurities from being introduced.

For example, the upper adhesive portion 530 of the light-blocking tape 500 may have a higher position than the lower adhesive portion 510, and the shielding portion 520 may be disposed at an incline. The shape and adhered position of the light-blocking tape 500 may be modified as desired. The display device including the above configuration according to the first embodiment may reduce or prevent light leakage and the introduction of impurities around the camera hole CH, which may degrade display performance, using the light-blocking tape 500.

Figure 5:
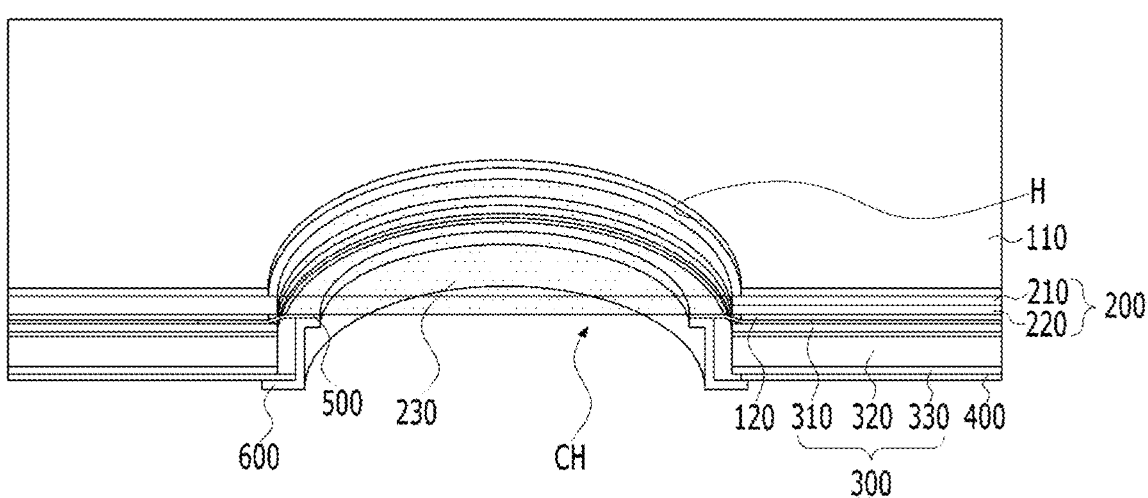
FIG. 5 is a perspective view of a camera hole region in a display device according to a second embodiment.
Figure 6:
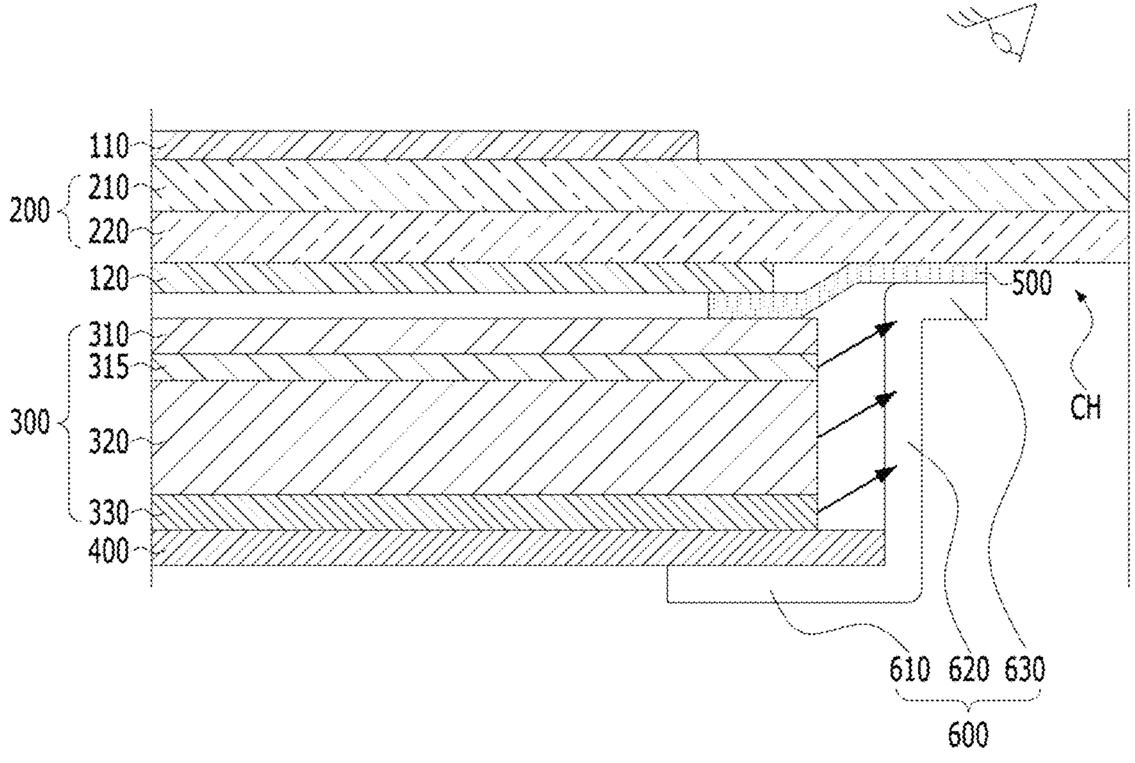
FIG. 6 is a cross-sectional view of the embodiment of FIG. 5.

FIG. 5 is a perspective view of a camera hole region in a display device according to a second embodiment. FIG. 6 is a cross-sectional view of the configuration of FIG. 5.

With reference to FIGS. 5 and 6, according to the second embodiment, the display device may further include, as a further light-blocking member, an insert mold 600, in addition to the light-blocking tape 500 according to the aforementioned embodiment. As described above, the light-blocking tape 500 may reduce or prevent light leakage and the introduction of impurities while being positioned at an upper region of a side surface of an internal portion of the camera hole CH.

The insert mold 600 may be inserted into the camera hole CH, which may double the aforementioned effect, while being coupled to the light-blocking tape 500 and the cover bottom 400. The insert mold 600 may include a plastic resin or a metallic material, although embodiments are not limited thereto.

The insert mold 600 may include a bottom-coupling portion 610, an upper support portion 630, and a side surface connection portion 620. The insert mold 600 may be formed by coupling various forms of rings and may have a cross-section similar to the shape of a 'Z'.

The bottom-coupling portion 610 may be coupled to the cover bottom 400. For example, the bottom-coupling portion 610 may be formed as a ring constituting a lower region of the insert mold 600, and may have an upper surface that may contact the lower surface of the cover bottom 400. For example, the bottom-coupling portion 610 may be shaped as a ring having a horizontal surface that may extend externally toward the cover bottom 400 from the camera hole CH.

The upper support portion 630 may support the light-blocking tape 500. For example, the upper support portion 630 may be shaped as a ring constituting an upper region of the insert mold 600, and may have an upper surface that may contact the lower surface of the light-blocking tape 500. For example, the upper support portion 630 may be shaped as a ring having a horizontal surface that may internally extend toward the center of the camera hole CH.

The side surface connection portion 620 may connect the bottom-coupling portion 610 and the upper support portion 630. For example, the side surface connection portion 620 may constitute a side surface of the insert mold 600, and may be shaped as a ring. The side surface connection portion 620 may be disposed vertically and lengthwise in the camera hole CH to shield the backlight unit 300, including the light guide plate 320, from the camera hole CH.

For example, according to the second embodiment, the light guide plate 320 and the camera hole CH may be shielded from each other through the insert mold 600. Thus, as indicated by the arrows shown in FIG. 6, light emitted from the light guide plate 320 may be blocked to be reduced or prevented from entering the camera hole CH. The display device including the above configuration according to the second embodiment may remarkably reduce or prevent light leakage and the introduction of impurities around the camera hole CH, which may degrade display performance, using the light-blocking tape 500 and the insert mold 600.

Figure 7:
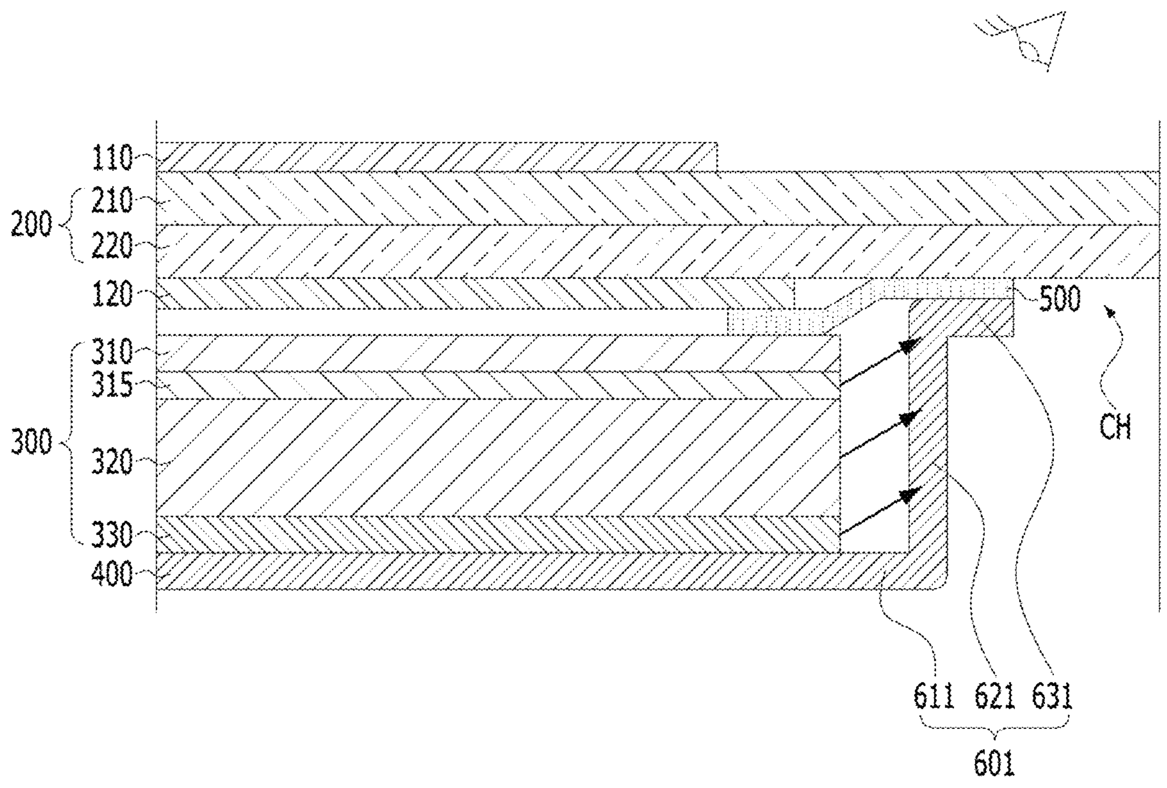
FIG. 7 is a cross-sectional view of a camera hole region in a display device according to a third embodiment.

FIG. 7 is a cross-sectional view of a camera hole region in a display device according to a third embodiment.

The third embodiment will be described in terms of differences from the second embodiment. With reference to FIG. 7, the display device according to the third embodiment may be similar to the second embodiment in that the display device includes the light-blocking tape 500 and an insert mold 601 as light-blocking members. However, the display device according to the third embodiment is different from the aforementioned second embodiment in that the bottom-coupling portion 610 of the insert mold 600 according to the second embodiment is positioned below a cover bottom 400, but according to the third embodiment, a bottom-coupling portion 611 of the insert mold 601 is coupled to a side surface of the cover bottom 400.

Here, the insert mold 601 may be manufactured to be integrated into the cover bottom 400. For example, the insert mold 601 inserted into the camera hole CH may be integrated into the cover bottom 400. For example, the insert mold 601 may include the same metallic material as the cover bottom 400. For example, an upper support portion 631 may also support the light-blocking tape 500, and a side surface connection portion 621 may connect the bottom-coupling portion 611 and the upper support portion 631 to each other.

According to the third embodiment, the light guide plate 320 and the camera hole CH may be shielded from each other through the insert mold 601. Thus, as indicated by the arrows shown in FIG. 7, light emitted from the light guide plate 320 may be blocked to be prevented from entering the camera hole CH. The display device including the above configuration according to the third embodiment may remarkably reduce or prevent light leakage and the introduction of impurities around the camera hole CH, which may degrade display performance, using the light-blocking tape 500 and the insert mold 601.

Figure 8:
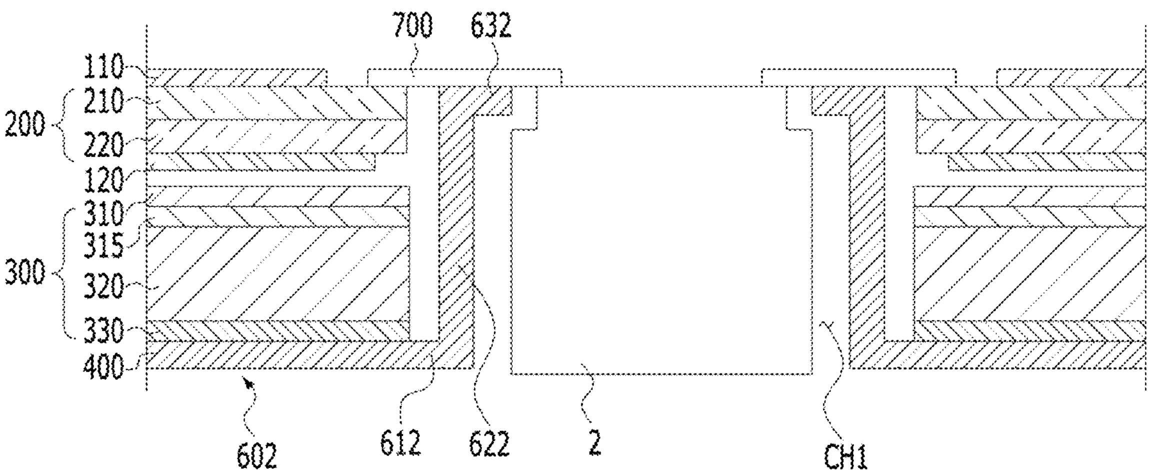
FIG. 8 is a cross-sectional view of a camera hole region in a display device according to a fourth embodiment.

FIG. 8 is a cross-sectional view of a camera hole region in a display device according to a fourth embodiment.

The fourth embodiment will be described in terms of differences from the third embodiment. The fourth embodiment is different from the third embodiment in that a camera hole CH1 according to the fourth embodiment is formed more deeply to penetrate the liquid crystal panel. For example, the camera hole CH1, instead of the transparent portion 230, may penetrate the color filter substrate 210 and the array substrate 220 of the liquid crystal panel 200.

Accordingly, the camera 2 may be inserted up to a position of the camera hole CH1 in the liquid crystal panel 200, and may be positioned up to a position of a lower portion of a cover glass (not shown), which may be above the liquid crystal panel 200. According to the fourth embodiment, an insert mold 602 may include a bottom-coupling portion 612 coupled to the cover bottom 400, an upper support portion 632 for supporting a light-blocking tape 700, and a side surface connection portion 622 for connecting the bottom-coupling portion 612 and the upper support portion 632.

Here, the light-blocking tape 700 may be different from the light-blocking tape 500 according to the fourth embodiment in that the light-blocking tape 700 may be attached to a portion of an upper surface of the liquid crystal panel 200, e.g., the color filter substrate 210, and a portion of an upper surface of the camera 2. For example, the outermost region of the light-blocking tape 700 may contact a cover glass and the color filter substrate 210, and the innermost region may contact the cover glass, the upper support portion 632 of the insert mold 602, and an upper surface of the camera 2.

The upper support portion 632 of the insert mold 602 may be parallel to the color filter substrate 210 of the liquid crystal panel 200 to less or minimally impinge upon the region in which the camera 2 may be positioned, and may have the same thickness as the color filter substrate 210. In addition, the insert mold 602 may be integrated into the cover bottom 400 (e.g., in a similar manner as described for the third embodiment shown in FIG. 7); or may be manufactured separately from the cover bottom 400, and may be coupled thereto (e.g., in a similar manner as described for the second embodiment shown in FIGS. 5 and 6). The display device including the above configuration according to the fourth embodiment may reduce or prevent light leakage and the introduction of impurities around the camera hole CH1 using the light-blocking tape 700 and the insert mold 602 in a display including the camera hole CH1 that may extend to the liquid crystal panel 200.

Figure 9:
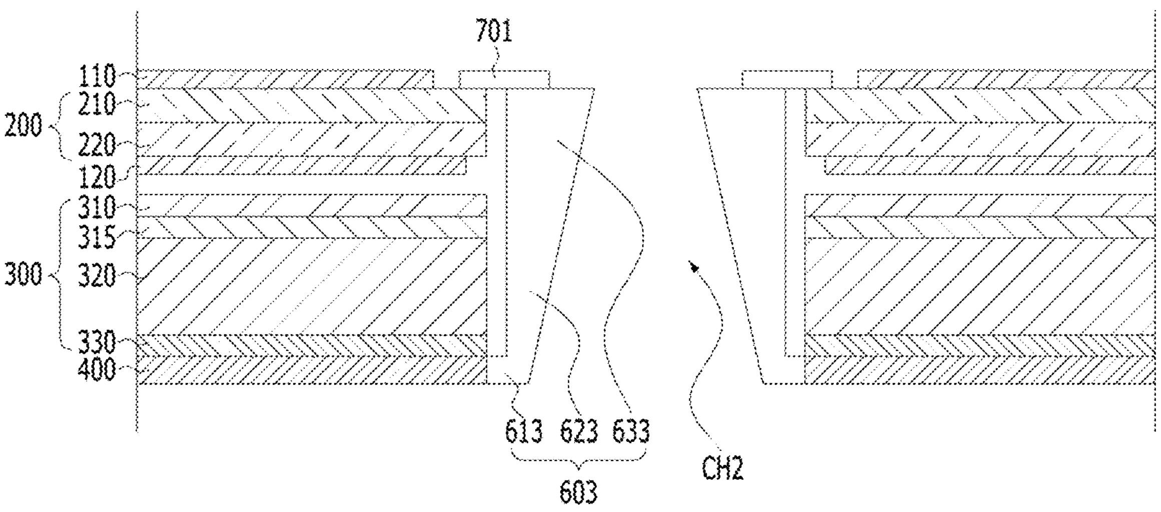
FIG. 9 is a cross-sectional view of a camera hole region in a display device according to a fifth embodiment.

FIG. 9 is a cross-sectional view of a camera hole region in a display device according to a fifth embodiment.

The fifth embodiment will be described in terms of differences from the fourth embodiment. The fifth embodiment is similar to the fourth embodiment in that a camera hole CH2 according to the fifth embodiment is formed more deeply to penetrate the liquid crystal panel 200, and the display device includes a light-blocking tape 701 and an insert mold 603.

However, the light-blocking tape 701 may be different from the light-blocking tape 700 according to the fourth embodiment in that the light-blocking tape 701 may be attached to a portion that may extend to an upper portion of the liquid crystal panel 200, e.g., the color filter substrate 210 and an upper support portion 633. For example, the outermost region of the light-blocking tape 701 may contact a cover glass and the color filter substrate 210 and the innermost region of the light-blocking tape 701 may contact the cover glass and the upper support portion 633 of the insert mold 603.

Unlike the fourth embodiment, the insert mold 603 of the fifth embodiment may be configured such that a side surface connection portion 623 of the insert mold 603 may protrude into a region (e.g., towards a center) of the camera hole CH2 to have a cross-section that gradually increases in size toward the upper support portion 633 of the insert mold 603 from a bottom-coupling portion 613 of the insert mold 603.

The shape of the insert mold 603 is a modified embodiment to correspond to the shape of the camera 2. Thus, an upper region of the camera hole CH2 may constitute a narrower space than a lower region to provide a structure for more effectively reducing or preventing the introduction of impurities and light leakage. In the display device including the above configuration according to the fifth embodiment, a display including the camera hole CH2 that may extend to the liquid crystal panel 200 may reduce or prevent light leakage and the introduction of impurities around the camera hole CH2 using the light-blocking tape 701 and the insert mold 603.

Figure 10:
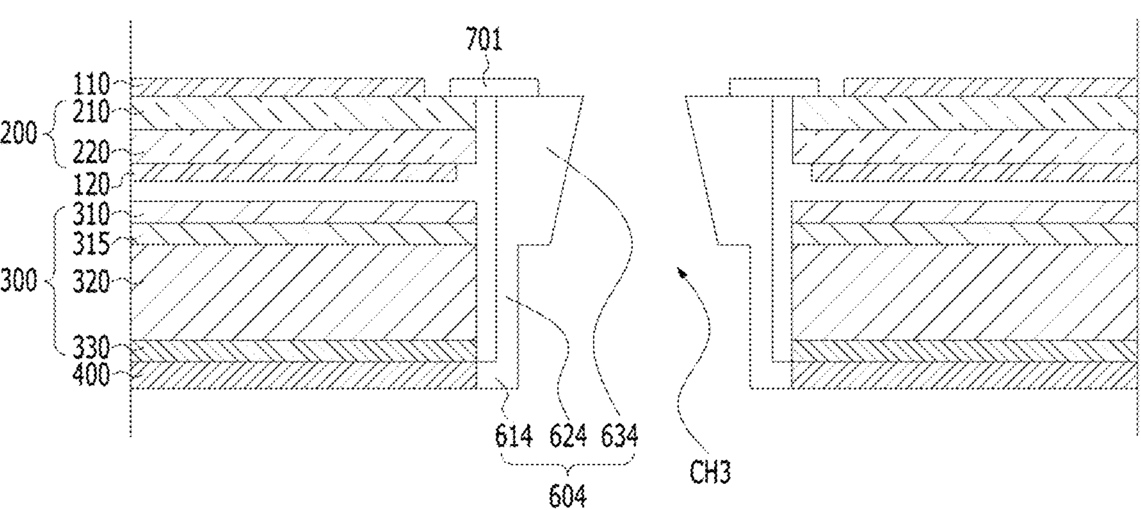
FIG. 10 is a cross-sectional view of a camera hole region in a display device according to a sixth embodiment.

FIG. 10 is a cross-sectional view of a camera hole region in a display device according to a sixth embodiment.

The sixth embodiment will be described in terms of differences from the aforementioned fifth embodiment. The sixth embodiment is similar to the fourth embodiment in that a camera hole CH3 according to the sixth embodiment is formed more deeply to penetrate the liquid crystal panel 200, and the light-blocking tape 701 is attached to the same position as in the fifth embodiment.

Unlike the fifth embodiment, an upper support portion 634 of an insert mold 604 of the sixth embodiment may have a predetermined thickness from an upper portion of the light guide plate 320 to the liquid crystal panel 200. The insert mold 604 may also include a bottom-coupling portion 614 and a side surface connection portion 624. In addition, unlike the fifth embodiment, the upper support portion 634 of the sixth embodiment may protrude into a region (e.g., towards a center) of the camera hole CH3 to have a cross-section that gradually increases in size toward the liquid crystal panel 200.

The shape of the insert mold 604 is another modified embodiment to correspond to the shape of a camera. In the display device including the above configuration according to the sixth embodiment, a display device (e.g., the display device 1), including the camera hole CH3 that may extend to the liquid crystal panel 200, may reduce or prevent light leakage and the introduction of impurities around the camera hole CH3 using the light-blocking tape 701 and the insert mold 604.

Figure 11:
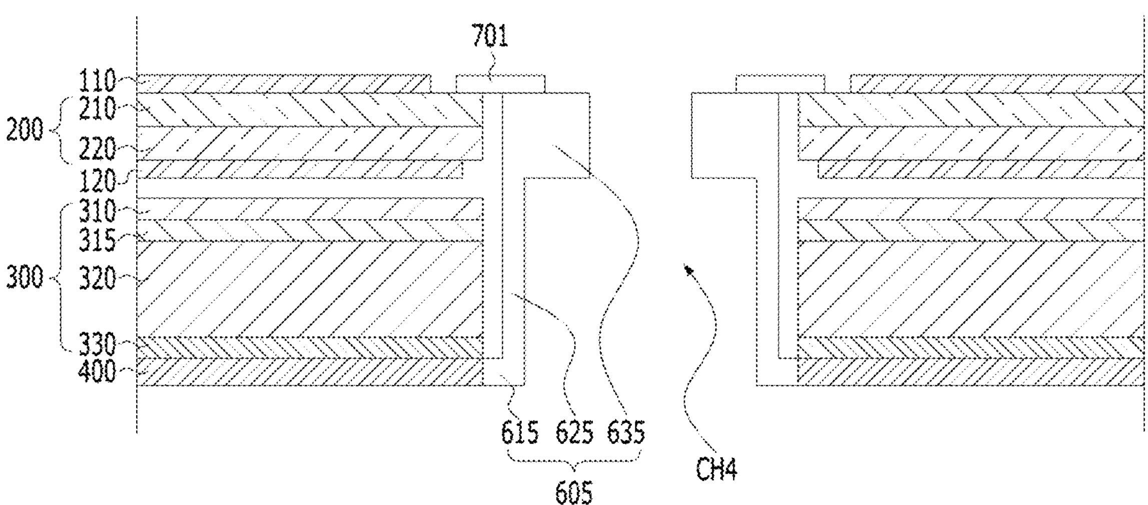
FIG. 11 is a cross-sectional view of a camera hole region in a display device according to a seventh embodiment.

FIG. 11 is a cross-sectional view of a camera hole region in a display device according to a seventh embodiment.

The seventh embodiment will be described in terms of differences from the aforementioned sixth embodiment. The seventh embodiment is similar to the sixth embodiment in that a camera hole CH4 according to the seventh embodiment is formed more deeply to penetrate the liquid crystal panel 200, and in that the light-blocking tape 701 is attached to the same position as in the sixth embodiment.

However, unlike the sixth embodiment, an upper support portion 635 of an insert mold 605 of the seventh embodiment may have a predetermined thickness from the lower polarizing plate 120 to the liquid crystal panel 200 (e.g., from the lower surface of the polarizing plate 120 to the upper surface of the liquid crystal panel 200). In addition, unlike the sixth embodiment, the upper support portion 635 of the seventh embodiment may protrude into a region (e.g., towards a center) of the camera hole CH4 compared with a side surface connection portion 625. The insert mold 605 may also include a bottom-coupling portion 615.

The shape of the insert mold 605 is another modified embodiment to correspond to the shape of a camera. In the display device including the above configuration according to the seventh embodiment, a display device (e.g., the display device 1), including the camera hole CH4, which may extend to the liquid crystal panel 200 may reduce or prevent light leakage and the introduction of impurities around the camera hole CH4 using the light-blocking tape 701 and the insert mold 605.

Figure 12:
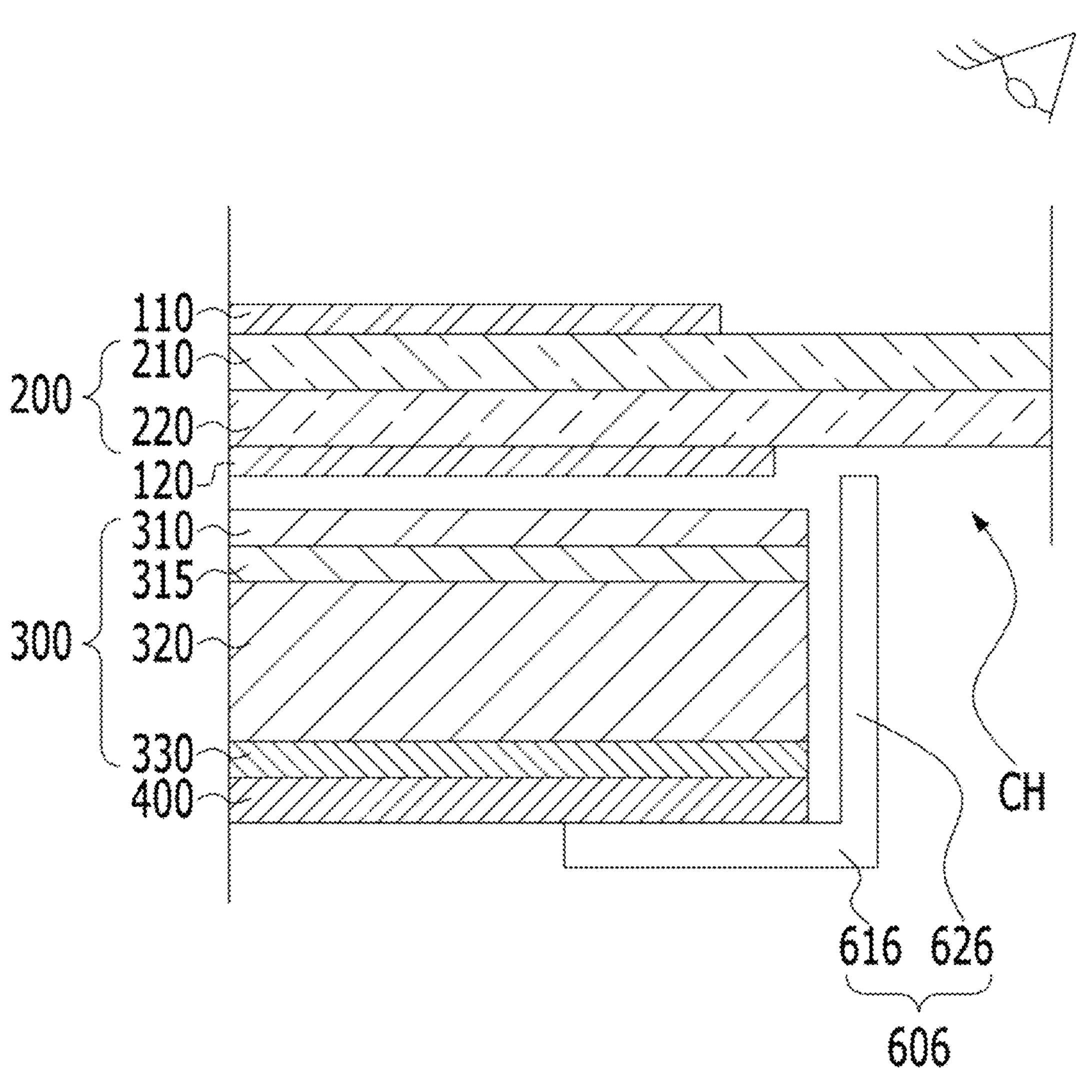
FIG. 12 is a cross-sectional view of a camera hole region in a display device according to an eighth embodiment.

FIG. 12 is a cross-sectional view of a camera hole region in a display device according to an eighth embodiment.

The eighth embodiment will be described in terms of differences from the aforementioned embodiments. As in the first to third embodiments, according to the eighth embodiment, the camera hole CH may not be formed in the liquid crystal panel 200, and the transparent portion 230 may be formed. However, the eighth embodiment may be different from the aforementioned first to third embodiments in that an insert mold 606 (which may serve as light-blocking member) may be inserted into the camera hole CH without use of the light-blocking tape 500.

For example, as illustrated in FIG. 12, the insert mold 606 may include a bottom-coupling portion 616 coupled to a lower portion of the cover bottom 400, and a side surface extension portion 626 that may perpendicularly extend from the bottom-coupling portion 616, and may be inserted into a side surface of the camera hole CH. However, according to the eighth embodiment, the display device may not include the light-blocking tape 500, and thus, may not include the upper support portions 630 to 631 for supporting the light-blocking tape 500. The display device including the above configuration according to the eighth embodiment may reduce or prevent light leakage and the introduction of impurities around the camera hole CH, which may degrade display performance, using the insert mold 606.

Figure 13:
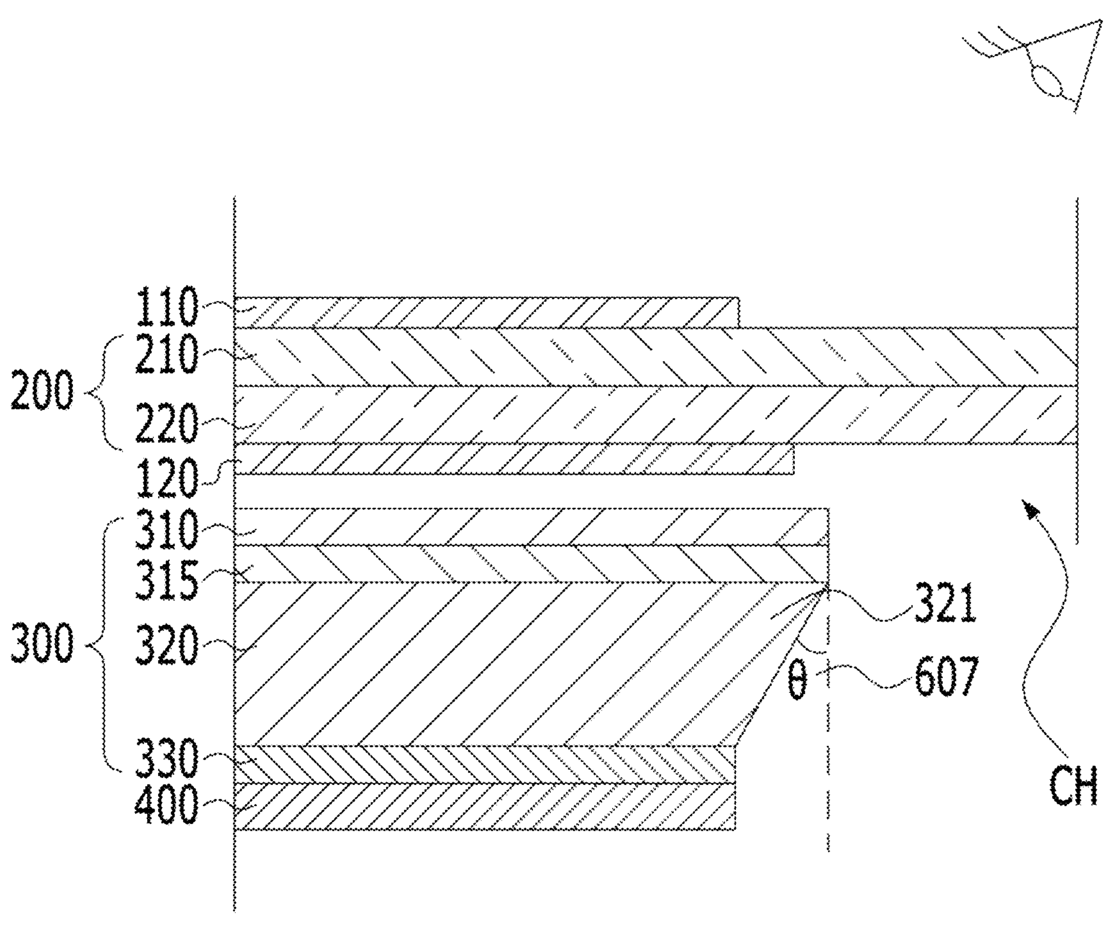
FIG. 13 is a cross-sectional view of a camera hole region in a display device according to a ninth embodiment.

FIG. 13 is a cross-sectional view of a camera hole region in a display device according to a ninth embodiment. FIG. 14 is a diagram showing a simulation result of bright line distribution of light depending on an inclination angle of the light guide plate of FIG. 13.

The ninth embodiment will be described in terms of differences from the aforementioned embodiments. The ninth embodiment is different from the aforementioned embodiments in that the display device according to the ninth embodiment includes a light leakage prevention portion 607, which may be formed by cutting the side surface of the light guide plate 320 adjacent to the camera hole CH downward by a predetermined angle θ for reducing or preventing light leakage. For example, according to the ninth embodiment, the light-blocking tapes 500, 700, and 701 and the insert molds 601 to 606 according to the aforementioned embodiments may not be used. Instead, the light leakage prevention portion 607 may be formed on the light guide plate 320.

The light leakage prevention portion 607 may reflect the light emitted from the light guide plate 320 by an inclination surface to reduce or prevent the same from escaping to the outside. For example, the predetermined angle may be in the range from 30° to 60° between a vertical line and a side surface of the light guide plate 320, and the light guide plate 320 may be cut at the predetermined angle to form the inclined side surface of the light guide plate 320 and thus define the light leakage prevention portion 607. For example, the side surface of the light guide plate 320 that faces the camera hole CH may be inclined by an angle θ, as shown in FIG. 13, and thus may define the light leakage prevention portion 607.

As seen from FIG. 14, when the light guide plate 320 includes an incision surface formed at various inclination angles θ, bright line distribution of light may be changed depending on the inclination angle θ. For example, it may be seen that light leakage may be observed in the smallest amount when the inclination angle θ is in the range of 30° to 60°. In addition, as seen from the simulation experimental result, when the inclination angle θ is 45°, the optimum effect may be achieved.

Here, the cover bottom 400 adjacent to the camera hole CH may have a width parallel to the lower surface of the light guide plate 320 that may form the light leakage prevention portion 607. The reflector plate 330 positioned above the light guide plate 320 may also have the same width as the cover bottom 400.

Although not illustrated, the display device including the light leakage prevention portion 607 according to the ninth embodiment may further include the light-blocking tape 500 according to the eighth embodiment, which may be attached to the lower polarizing plate 120 and the liquid crystal panel 200 positioned above a side surface of the camera hole CH, and may reduce or prevent light leakage. The display device including the above configuration according to the ninth embodiment may reduce or prevent light leakage around the camera hole CH, which may degrade display performance, using the light leakage prevention portion 607.

The aforementioned display device according to embodiments of the present disclosure may be applied to various electronic apparatuses, such as a television (TV), a smart phone, or a tablet personal computer (PC). The display device according to the present disclosure may reduce or prevent light leakage and the introduction of impurities through a camera hole to enhance display performance in a narrow bezel display including a camera.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display device, comprising:

a backlight unit comprising a light guide plate;

a camera hole penetrating the backlight unit;

a camera in the camera hole;

a light-blocking member in the camera hole;

a liquid crystal panel on the backlight unit, the liquid crystal panel comprising a transparent portion on the camera hole;

a polarizing plate on a lower surface of the liquid crystal panel excluding the transparent portion of the liquid crystal panel; and a cover bottom under the backlight unit, wherein the light-blocking member includes a light-blocking tape that is directly attached to a lower surface of the polarizing plate and a lower surface of the transparent portion of the liquid crystal panel, and an insert mold that is in direct contact with a lower surface of the light-blocking tape and a lower surface of the cover bottom.

2. The display device of claim 1, wherein the light-blocking member covers a portion of the camera hole located between the camera and the liquid crystal panel.

3. The display device of claim 1, wherein:

the camera hole has a circular cross-section; and the light-blocking tape is shaped as a circular ring that is concentric with a circumferential surface of the camera hole.

4. The display device of claim 1, wherein the insert mold comprises:

a bottom-coupling portion coupled to the lower surface of the cover bottom;

an upper support portion supporting the light-blocking tape; and a side surface connection portion connecting the bottom-coupling portion to the upper support portion.

* * * * *